(12) United States Patent
Bertin

(10) Patent No.: US 11,885,649 B2
(45) Date of Patent: Jan. 30, 2024

(54) ROTOR FOR INDUCTIVE SLIP, ECCENTRICITY, AND TILT SENSING

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/657,768

(22) Filed: Apr. 4, 2022

(65) Prior Publication Data

US 2022/0326050 A1     Oct. 13, 2022

Related U.S. Application Data

(60) Provisional application No. 63/201,038, filed on Apr. 9, 2021.

(51) Int. Cl.
*G01D 5/20* (2006.01)
*H02K 11/20* (2016.01)
*H02P 8/34* (2006.01)

(52) U.S. Cl.
CPC ............ *G01D 5/202* (2013.01); *H02K 11/20* (2016.01); *H02P 8/34* (2013.01)

(58) Field of Classification Search
None
See application file for complete search history.

(56) References Cited

U.S. PATENT DOCUMENTS

| | | | |
|---|---|---|---|
| 6,236,199 | B1 | 5/2001 | Irle et al. |
| 7,221,154 | B2 | 5/2007 | Lee |
| 7,345,473 | B2 | 3/2008 | Lee |
| 8,453,518 | B2 | 6/2013 | Diekmann et al. |
| 9,528,858 | B2 | 12/2016 | Bertin |
| 10,444,037 | B2 | 10/2019 | Bertin |
| 11,079,291 | B2 | 8/2021 | Bertin |
| 2004/0041572 | A1 | 3/2004 | Lin et al. |
| 2006/0066167 | A1 | 3/2006 | Saito et al. |

(Continued)

FOREIGN PATENT DOCUMENTS

EP     0 909 955 A2     4/1999

OTHER PUBLICATIONS

B. Aschenbrenner and B. G. Zagar "Analysis and Validation of a Planar High-Frequency Contactless Absolute Inductive Position Sensor" in IEEE Trans. On Instrum. and Meas., Mar. 2015, pp. 768-775.

(Continued)

*Primary Examiner* — Douglas X Rodriguez
(74) *Attorney, Agent, or Firm* — Brake Hughes Bellermann LLP

(57) ABSTRACT

In at least one general aspect, an inductive sensor can include a shaft having an axis of rotation, and a rotor physically coupled to the shaft and including a rotor coil. The rotor and the rotor coil can be aligned along a plane orthogonal to the axis of rotation. The inductive sensor can include a stator including a stator layer, an excitation coil, and an eccentricity receiver coil where the excitation coil and the eccentricity receiver coil are physically coupled to the stator layer.

24 Claims, 10 Drawing Sheets

(56) References Cited

U.S. PATENT DOCUMENTS

| | | |
|---|---|---|
| 2006/0233123 A1 | 10/2006 | Lee |
| 2007/0194782 A1 | 8/2007 | Lee |
| 2009/0133867 A1 | 5/2009 | Kuckes |
| 2010/0319467 A1 | 12/2010 | Diekmann et al. |
| 2012/0175198 A1 | 7/2012 | Thibault et al. |
| 2013/0003820 A1 | 1/2013 | Malhan et al. |
| 2014/0055000 A1 | 2/2014 | Adra |
| 2014/0132253 A1 | 5/2014 | Bertin |
| 2014/0167788 A1 | 6/2014 | Fontanet |
| 2016/0079839 A1 | 3/2016 | Shim et al. |
| 2016/0273945 A1 | 9/2016 | Olsak et al. |
| 2017/0166251 A1* | 6/2017 | Shao ............... G01L 3/105 |
| 2018/0029223 A1 | 2/2018 | Kitamura et al. |
| 2019/0072414 A1 | 3/2019 | Utermoehlen et al. |
| 2019/0097501 A1 | 3/2019 | Lin et al. |
| 2019/0310148 A1* | 10/2019 | Bertin ............... G01L 3/105 |
| 2020/0088549 A1 | 3/2020 | Shao |
| 2020/0278190 A1 | 9/2020 | Bertini et al. |
| 2021/0190545 A1* | 6/2021 | Utermoehlen ....... G01D 5/2073 |

OTHER PUBLICATIONS

PEEC-Based Numerical Optimization of Compact Radial Position Sensors for Active Magnetic Bearings; Andreas Müsing, Claudius Zingerli, Philipp Imoberdorf, Johann W. Kolar, Power Electronic Systems Laboratory, ETH Zurich, Switzerland, published in 5th International Conference on Integrated Power Electronics Systems, Mar. 11-13, 2008.

Shao, Lingmin, "Automotive Inductive Position Sensor" (2017). Electronic Thesis and Dissertation Repository. 4569. https://ir.lib.uwo.ca/etd/4569, retrieved on May 5, 2017, 12:00 AM.

\* cited by examiner

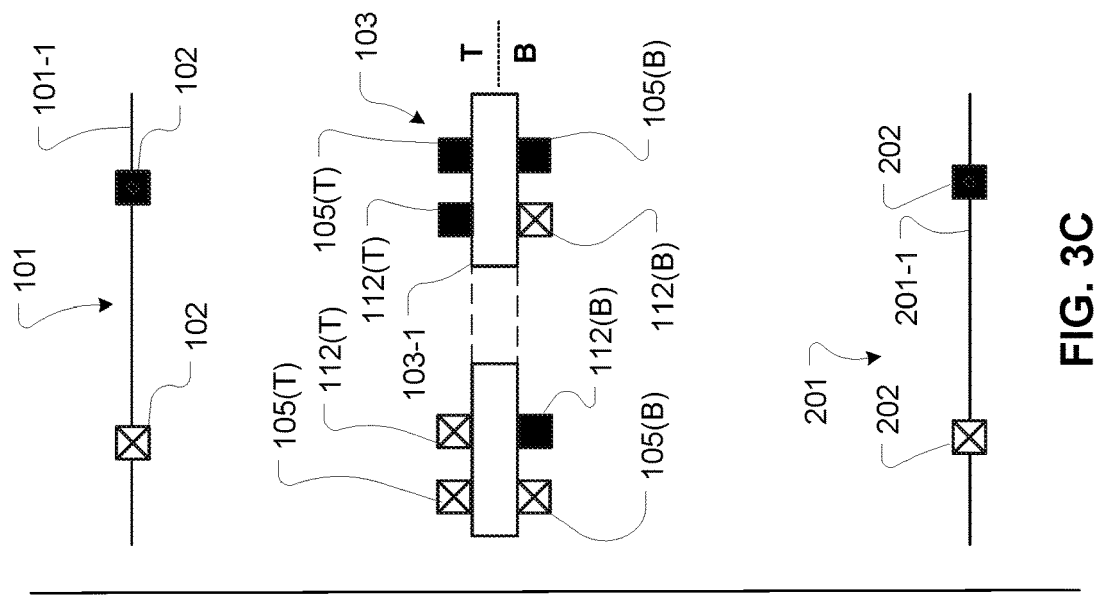
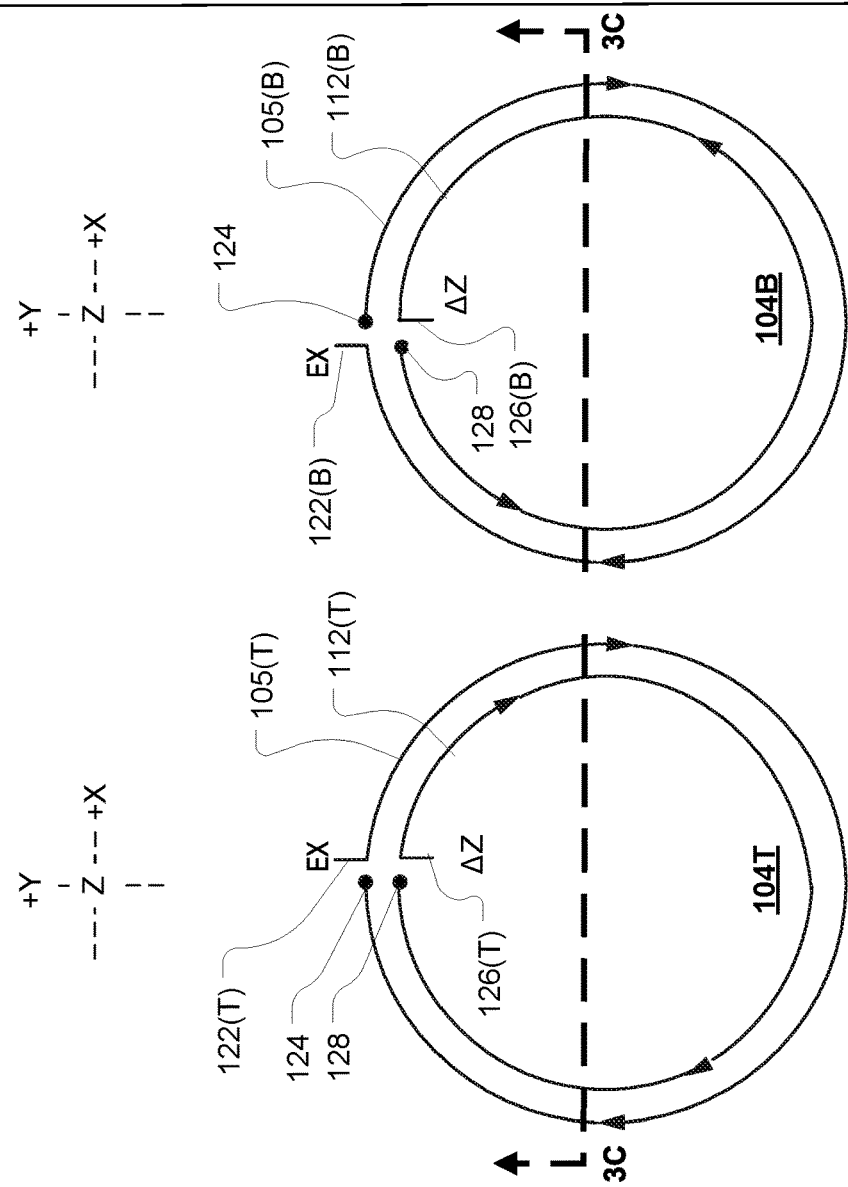

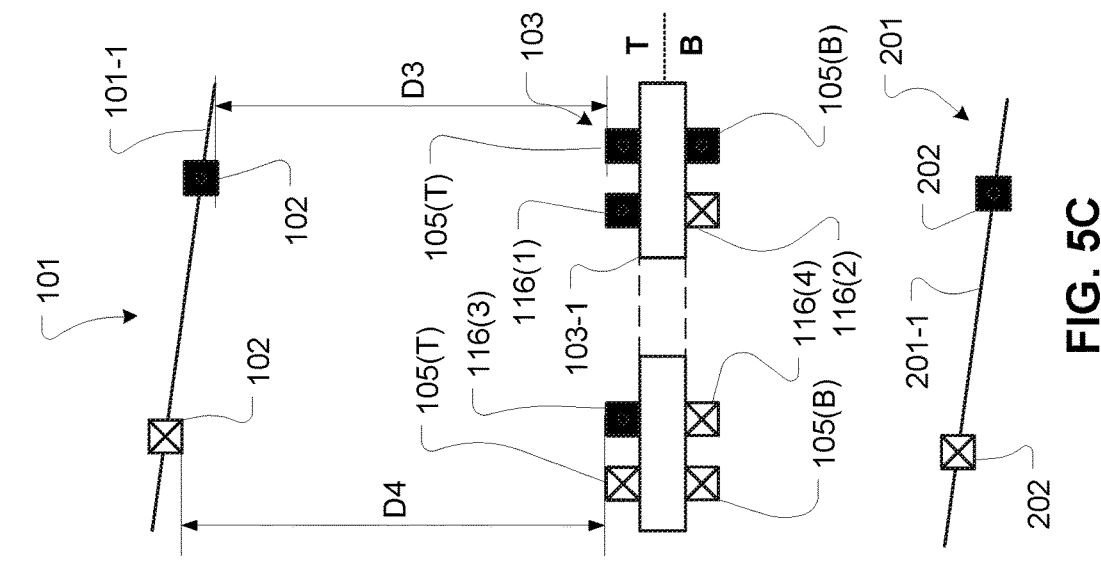
FIG. 5C
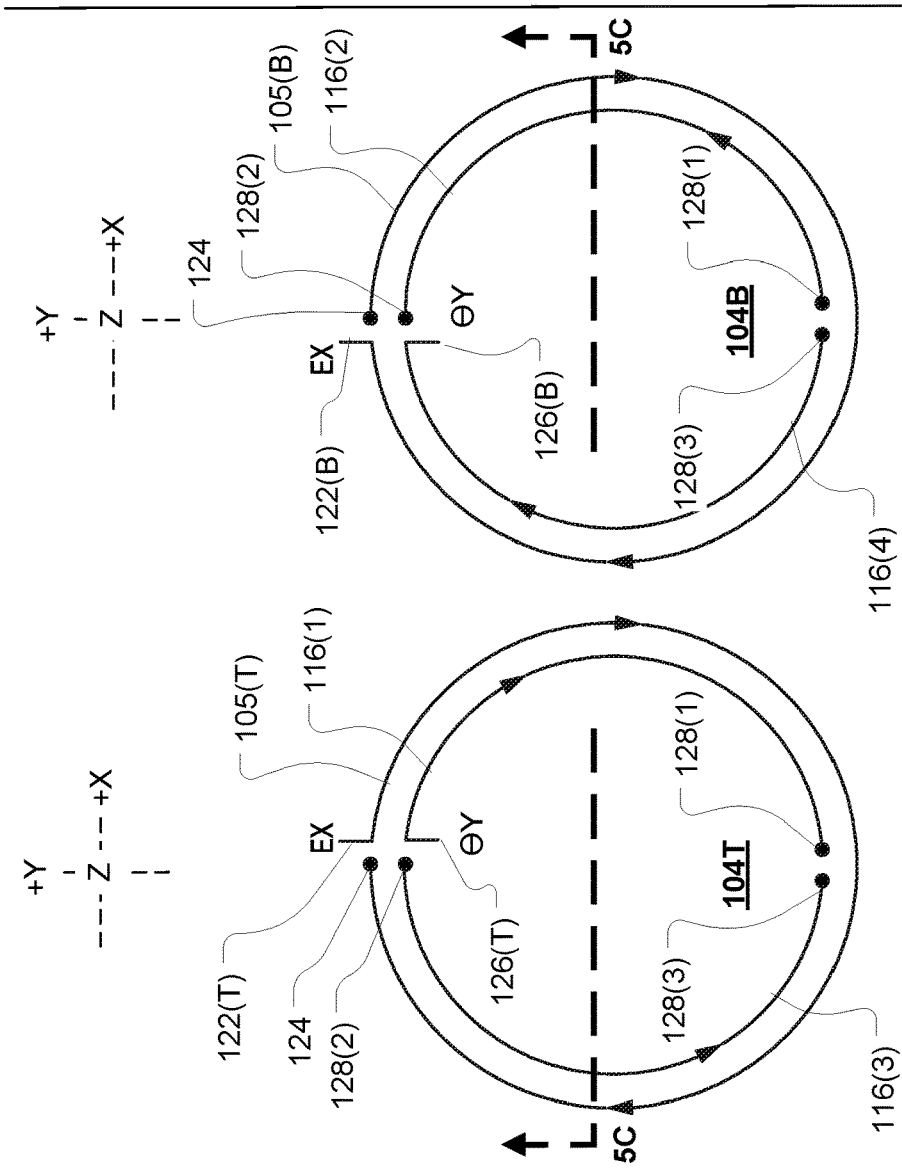
FIG. 5B
FIG. 5A

ROTOR FOR INDUCTIVE SLIP, ECCENTRICITY, AND TILT SENSING

CROSS-REFERENCE TO RELATED APPLICATION

The present application claims priority to U.S. Provisional Application Ser. No. 63/201,038, filed on 9 Apr. 2021, which is incorporated herein by reference in its entirety.

TECHNICAL FIELD

The technology described herein generally relates to devices, systems, and methods for determining whether a motor shaft or a machine shaft is misaligned.

BACKGROUND

Misalignments of a shaft in a machine, motor, or other assembly can be problematic for operation. Known devices for determining such misalignment may require flexible placement, may be limited in capability, may not be sensitive, and/or so forth.

SUMMARY

The various implementations of the present disclosure relate in general to inductive eccentricity and tilt sensors and systems and methods for manufacturing and use thereof (collectively referred to herein as an inductive sensor and inductive sensing).

In at least one general aspect, an inductive sensor can include a shaft having an axis of rotation, and a rotor physically coupled to the shaft and including a rotor coil. The rotor and the rotor coil can be aligned along a plane orthogonal to the axis of rotation. The inductive sensor can include a stator including a stator layer, an excitation coil, and an eccentricity receiver coil where the excitation coil and the eccentricity receiver coil are physically coupled to the stator layer.

In another general aspect, an inductive sensor can include a shaft having an axis of rotation. The inductive sensor can include a stator being disposed around the shaft and including a stator layer, an excitation coil, and at least one receiver coil where the excitation coil and the at least one receiver coil can be coupled to the stator layer. The inductive sensor can include a rotor physically coupled to the shaft where the rotor includes a rotor substrate and a rotor coil coupled to at least a portion of the rotor substrate. The rotor substrate can be aligned along a plane orthogonal to the axis of rotation of the shaft, and the rotor coil can have at least a portion disposed between the plane and the stator.

BRIEF DESCRIPTION OF THE DRAWINGS

The features, aspects, advantages, functions, modules, and components of the devices, systems and methods provided by the various implementations of the present disclosure are further disclosed herein regarding at least one of the following descriptions and accompanying drawing figures. In the appended figures, similar components or elements of the same type may have the same reference number, such as 108, with an additional alphabetic designator, such as 108a, 108n, or the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIG. 3A is a schematic representation of an implementation of a top receiver coil in an inductive sensor configured for detecting slip misalignments of a shaft and in accordance with an implementation.

FIG. 3B is a schematic representation of an implementation of a bottom receiver coil in an inductive sensor configured for detecting slip misalignments of a shaft and in accordance with an implementation.

FIG. 3C is a cross-sectional view of the inductive sensor of FIGS. 3A and 3B, and further shows currents in excitation coils, receiver coils and rotor coils in accordance with an implementation.

FIG. 5A is a schematic representation of an implementation of top receiver coils in an inductive sensor configured for detecting tilt misalignments of a shaft relative to a representative axis, such as a Y-axis, and in accordance with an implementation.

FIG. 5B is a schematic representation of an implementation of bottom receiver coils in an inductive sensor configured for detecting tilt misalignments of a shaft relative to a representative axis, such as a Y-axis, and in accordance with an implementation.

FIG. 5C is a cross-sectional view of the inductive sensor of FIGS. 5A and 5B which further shows currents in excitation coils, receiver coils and rotor coils and in accordance with an implementation.

DETAILED DESCRIPTION

Figure 1A:
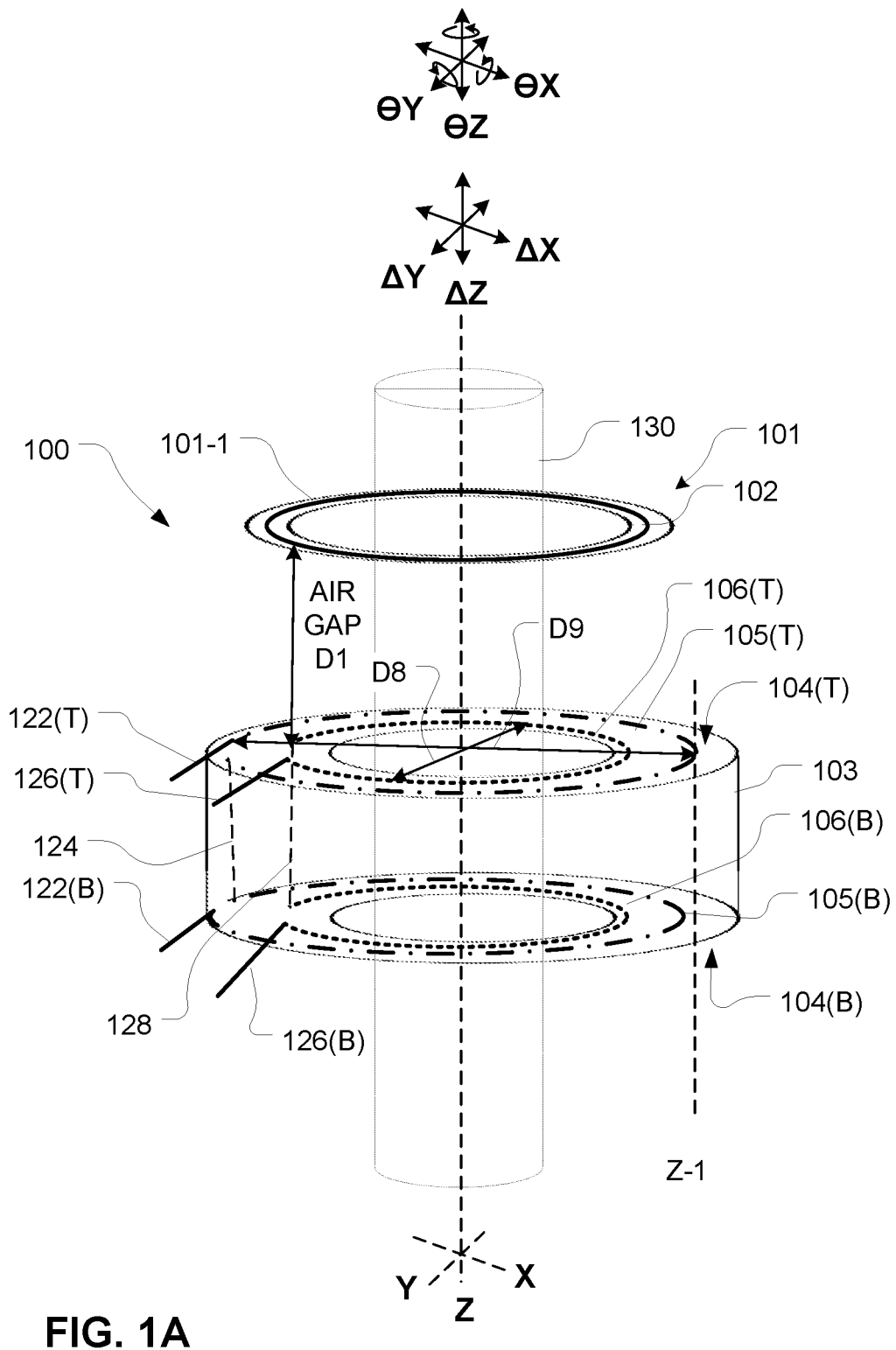
FIG. 1A is a schematic representation of a single rotor inductive sensor configured in accordance with an implementation.

The various implementations described herein are directed to devices, systems, and methods for inductively determining misalignments of a shaft in a machine, motor, or other assembly. As used herein, a shaft may have any length, diameter, composition of materials or otherwise. A shaft may be used for any purpose. The alignment of a shaft is herein determined relative to a shaft's intended use, such as a drive shaft in a motor, and not with respect to other coordinate spaces, orientations or otherwise, such as a rotation of a vehicle containing the motor. Herein, for purposes of explanation, a shaft rotates about a center axis (e.g., a Z-axis) of a coordinate space. During proper operation, the shaft may be defined as having a center axis that is congruent with the Z-axis.

For at least one implementation of the present disclosure, an inductive sensor may be configured to detect one or more of a slip misalignment, a tilt misalignment, an eccentricity misalignment, and combinations thereof. In some implementations, five degrees of freedom (e.g., $\Delta X$, $\Delta Y$, $\Delta Z$, $\theta X$, $\theta Y$) can be measured with one rotor and one stator. In some implementations, with the addition of another coil, six degrees of freedom (e.g., the addition of $\theta Z$) can be measured. The six degrees of freedom are illustrated in at least FIGS. 1A through 2B. In some implementations, the receiver coils can be configured with a differential architecture so that the direct coupling to the excitation coil is reduced (e.g., minimized).

Inductive sensors are often used to determine other aspects of an object, such as an angular position of an object. Implementations of the present disclosure may be used separately and/or in combination with such other types of inductive sensors.

In accordance with at least one implementation, an inductive sensor includes an excitation coil (EC) configured to generate an electromagnetic field when an electrical alternating current (AC) flows through the coil; at least one receiving coil, positioned within the excitation coil and configured to detect an electrical potential, a voltage, induced in the receiving coil by the currents flowing through the excitation coil; and a coupling element or rotor. To detect shaft misalignments, the rotor is coupled (e.g., physically coupled) to the shaft such that rotation of the shaft results in a rotation of the rotor. Misalignments of the shaft result in changes in the voltage potentials induced in the one or more receiving coils, with such voltage changes being detectable by a control circuit coupled to the excitation and receiving coils.

For at least one implementation, an excitation coil may include a multi-loop design and any number of loops may be used. The respective ends of the excitation coil may be coupled to a control circuit which controls the providing of electrical currents to the excitation coil from a power source. The control circuit may be coupled to and control one or more switches which selectively couple the excitation coil with a power source. The power source provides an AC signal, which results in the excitation coil generating a first electromagnetic field. Control circuits, switches, and AC sources used with inductive position sensors may be configured for use in an implementation of the present disclosure.

The excitation coil and receive coil(s) can be provided in a stator. The rotor is can be separated from a top surface of the stator by an air gap. The rotor may be configured as a coil, a geometric shape, or otherwise. The rotor is configured to disturb the amount of electrical potential induced in the receiving coil based on the rotor's then occurring alignment, such alignment corresponding to the current alignment of the shaft to which the rotor is physically coupled.

Machine and motor shafts (herein, a shaft) can be aligned relative by bearing assemblies. The bearing assemblies facilitate rotation of the shaft while maintaining such rotation relative to a given orientation within a given coordinate space. For purposes of simplicity, the shaft may be considered to rotate about a given axis, such as a Z axis of an X-Y-Z defined coordinate space. The bearing assemblies may take various forms. For some implementations, ball bearing type assemblies may be used. For other implementations where a shaft rotates at high-speeds, a non-limiting example being shafts rotating at five-hundred thousand revolutions per minute (500,000 rpm), magnetic bearing assemblies may be used.

With use, the bearing assemblies may wear out, become damaged, degrade, or other fail to properly align a given shaft. Misalignments may occur with regard to eccentricity, tilt, slip (e.g., vertical displacement such as movement of a shaft downward or upward), or otherwise. Misalignments, when occurring, may result in vibrations or other effects which can damage equipment and may prevent safety risks.

As used herein, a slip misalignment of a shaft occurs when a given portion of a shaft (along the Z-axis) experiences a change, in a positive or negative direction (+/−Z), relative to a given reference point (for example, a top portion of a bearing assembly). A slip occurs when the shaft's relative portion that is supposed to be parallel with the reference point, at a given time, is not parallel with the given reference point. Slip misalignments may be detected using one or more receiver coils configured to detect such misalignments along the Z-axis.

As used herein, a tilt (or tilting) misalignment of a shaft occurs when the orientation of the shaft relative to a given X-Y reference plane is not perpendicular (e.g., not orthogonal) to the reference plane. Perpendicularity may be defined in absolute terms and/or in relative terms such as in view of a given tolerance from an absolute ninety-degree angle (90°). The given tolerance, if any, may vary over time and/or be implementation specific. For at least one implementation, a tilt misalignment of a shaft may be detectable in one or more directions relative to the given X-Y plane, such as an X-axis tilt (which may also be referred to as a roll) and/or a Y-axis tilt (which may also be referred to as a change of pitch). Tilt misalignments may be detected using one or more receiver coils configured to detect such misalignments along one or both of the X-axis and/or the Y-axis.

As used herein, an eccentricity misalignment of a shaft can occur when the center axis of the shaft shifts (along the given X-Y plane) such that the center axis is not congruent with the Z-axis of the given coordinate space. Eccentricity misalignments may be detected using one or more receiver coils configured to detect misalignments along one or both of the X-axis and/or the Y-axis.

To detect misalignments, one or more displacement sensors can be used in at least one known approach. For non-magnetic bearing assemblies, accelerometers and/or sounds sensors may be used. Sound sensors, for example, may determine where a bearing assembly is failing, or likely to fail, based upon changes in frequency characteristics associated with a given operating shaft. Such approaches are of limited useful because indirect measurements of a shaft and bearing assembly are used. For magnetic bearing assemblies, continuous adjustments to magnetic fields used to position a shaft may be needed. Further, such systems can have limited detectability, such as detecting misalignments on a one micrometer (1 um) or larger basis. For some implementations, finer detection and adjustments however are needed.

Further, various forms of known inductive sensors configured to detect shaft misalignments can include multiple sensors that are placed around the stator. These sensors are flexible and aligned outside of a stator and may not be in close proximity to the shaft.

In other known implementations, the shafts themselves may be used as a rotor for an inductive sensor. Such a configuration is undesirable as it inhibits close proximity placement of excitation, receiver, and rotor coils used in an inductive sensor. Accordingly, received signal strengths are thereby sensor accuracy may be diminished. Further, detecting tilting misalignments (as described below) are typically not possible.

The inductive sensors described herein can detect one or more of slip, tilt and eccentricity misalignments of shafts. These and other needs are addressed by one or more of the implementations of the present disclosure.

Figure 1B:
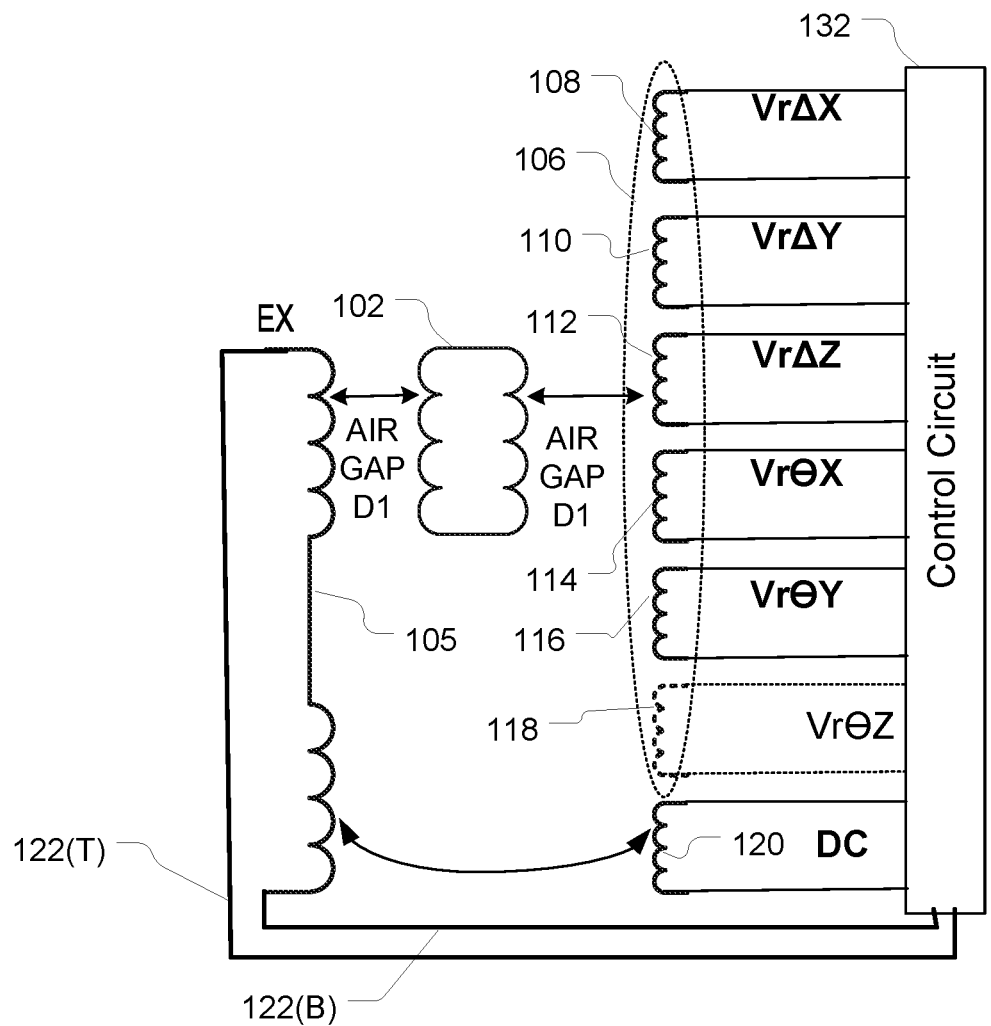
FIG. 1B is an electrical schematic representation of a single rotor inductive sensor configured in accordance with an implementation.

As shown for example in FIGS. 1A and 1B, an inductive sensor 100 may include a first rotor 101 and a stator 103. The implementation details associated with FIGS. 1A and 1B can be applied to any of the other implementations described herein. The stator 103 includes at least one excitation coil 105 and at least one receiver coil 106 (also can be referred to as or can include an eccentricity receiver coil) coupled to a control circuit 132. One or more of the at least one excitation coil 105 and/or the at least one receiver coil 106 can be coupled (e.g., physically coupled, mechanically coupled) to a surface of a stator substrate 103-1 of the stator 103.

The first rotor 101 is mechanically coupled to a shaft 130. The shaft 130 may terminate at the rotor 101 or extend beyond. The shaft 130 is located within a bearing assembly (not shown). A mechanical actuator, such as a motor, drive belt, or otherwise is coupled to the shaft and facilitates rotation of the shaft 130 about a central axis (e.g., a central axis of rotation, a longitudinal axis), such as the Z-axis shown in FIG. 1A. Any configuration, function, elements thereof, use and the like of the shaft 130 and the bearing assembly can be used in the implementations described herein.

For at least one implementation, the first rotor 101 includes a first rotor substrate 101-1 and at least one electrically conductive first rotor coil 102. The first rotor substrate 101-1 (or a portion thereof) may be provided as a rigid element (e.g., a printed-circuit-board (PCB) (or other structure)) on which the first rotor coil 102 may be configured. Any known and/or later arising techniques may be used to imprint the first rotor coil 102 onto the first rotor substrate 101-1. When the first rotor 101 is configured to encircle the shaft 130, the first rotor 101 may have a donut or ring type structure. When the first rotor 101 is configured to be coupled to an end member of the shaft 130, the first rotor 101 may be configured as a disc type structure, or otherwise.

As shown in at least FIG. 1A, the first rotor 101 (and first rotor substrate 101-1) are aligned along a plane orthogonal to the central axis of rotation (or longitudinal axis) of the shaft 130. The first rotor coil 102 can be coupled to the first rotor substrate 101-1. In some implementations, at least a portion of the first rotor coil 102 can be disposed on and/or embedded within the first rotor substrate 101-1. In some implementations, at least a portion of the first rotor coil 102 can be formed on and/or printed on the first rotor substrate 101-1. In some implementations, at least a portion of the first rotor coil 102 can be exposed outside of the first rotor substrate 101-1.

As shown in FIG. 1A, the first rotor coil 102 is circular. The circular shape of the first rotor coil 102 is important to make the sensing independent of the rotation of the shaft 130 and rotor 101.

The first rotor 101 may be configured to include the first rotor coil 102 as a closed loop which facilitates detection of misalignments of the shaft 130 through use of inductive coupling of the first rotor 101 with the excitation coil(s) 105 and receiver coil(s) 106. During use of the inductive sensor 100, first inductive coupling occurs between the first rotor 101 and the excitation coil(s) 105. A second inductive coupling also occurs between the first rotor 101 and the one or more receiver coil(s) 106. The second inductive coupling induces a receiver coil voltage Vr in a coil forming a given receiver coil 106. The one or more receiver coil voltages Vr may be used by a control circuit 132 (also can be referred to as a control unit) to detect one or more of a slip, tilt and/or eccentricity misalignment of the shaft 130. The control circuit 132 can be connected to a power source (not shown).

As mentioned above, in some implementations, the receiver coil(s) 106 and excitation coil(s) 105 can be configured with a differential architecture so that the direct coupling to at least the excitation coil(s) 106 is reduced (e.g., minimized). The differential architecture arrangements are shown and described in connection with at least FIGS. 3A through 5C and FIGS. 7A and 7B.

The stator 103 may be positioned relative to and about the shaft 130 so as to provide a fixed reference plane, such as one formed in the X-Y-Z coordinate system shown in FIG. 1A, for detecting one or more misalignments of the shaft 130. For at least one implementation, the stator 103 may be mechanically coupled to a bearing assembly, within which the shaft 130 rotates. For another implementation, the stator 103 may be mechanically coupled to a machine mount, motor mount, work stand, or other structure that is in a fixed position relative to the shaft 130 while not be not directly mechanically coupled to a bearing assembly.

As shown in FIGS. 1A and 1B, the stator 103 may be configured as a multiple layer structure on and through which the excitation coil(s) 105 and receiver coil(s) 106 are formed. The stator 103 includes a stator top layer 104(T) (STL) which defines a first given reference plane (such as an X-Y reference plane) and a stator bottom layer 104(B) (SBL) which defines a second given reference plane. For at least one implementation, the first given reference plane and the second given reference plane are parallel planes. As shown, an air gap D1 (also can be referred to as a gap or as a separation distance) separates the first rotor 101 from the stator top layer 104(T) (STL). A given stator layer, such as the STL and the SBL, may be described for purposes of explanation, as including two or more portions, such as a left portion, a right portion, a top portion and a bottom portion. Such portions may be referred to as first, second, third or fourth portions, as the case may be. Unless otherwise provided, such portion descriptions are not used for purposes of limitation and are used for purposes of relative orientation.

In some implementations, the air gap D1 between rotor 101 (and the rotor coil) and the stator 103 can be relatively small (e.g., reduced, minimized). In other words, in some implementations, the rotor 101 and the stator 103 can be relatively close proximity. In some implementations, the rotor 101 and the stator 103 can be relatively close proximity so that there may be high sensor sensitivity between the rotor coil 102 and the excitation coil(s) 104. In some implementations, the rotor 101 and the stator 103 can be relatively close proximity so that there may be high sensor sensitivity between the rotor coil 102 and the receiver coil(s) 106.

In some implementations, the air gap D1 is 10 times less than a diameter of at least one of the coils (e.g., excitation coil, receiver coil) so that the sensitivity (which is critical) can be high (e.g., maximized). In some implementations, the air gap D1 is 10 times less than a diameter D8 of an excitation coil (e.g., excitation coil 105(T)). In some implementations, the air gap D1 is 10 times less than a diameter D9 of a receiver coil (e.g., receiver coil 106(T)).

As shown in at least FIG. 1A, the rotor 101 can be aligned along a plane parallel to the stator 103. Accordingly, the rotor 101 can rotate within (or aligned along a plane) parallel to the stator 103. In some implementations, the rotor coil 102 is disposed above the stator 103 such that an axis Z-1 parallel to the axis of rotation (along the Z-axis) intersects both the rotor coil 102 and the stator 103 (as shown in at least FIG. 1A).

The excitation coil(s) 105 may include a top excitation coil structure 105(T) (TEC) and a bottom excitation coil structure 105(B) (BEC) (which can collectively or individually referred to as excitation coil(s)) that are connected by one or more excitation coil vias 124. The excitation coil(s) 105 are further coupled to the control circuit 132 by respective top and bottom excitation coil leads 122(T) and 122(B). Other configurations of the excitation coil leads 122 may be used, such as both leads being configured on the stator top layer 104(T) (STL) or on the stator bottom layer 104(B) (SBL) (which can collectively or individually referred to as stator layer(s)).

One or more of the stator layers can be a rigid element (e.g., a printed-circuit-board (PCB) (or other structure)) on which one or more coils such as the excitation coil(s) 105 and/or the receiver coil(s) 106 may be coupled (e.g., formed).

The receiver coil(s) 106 may also include a top receiver coil structure 106(T) and a bottom receiver coil structure 106(B) that are connected by one or more receiver coil vias 128 and are further coupled to the control circuit 132 by respective top and bottom receiver coil leads 126(T) and 126(B). Other configurations of the receiver coil leads 126 may be used, such as both leads being configured on the stator top layer 104(T) or on the stator bottom layer 104(B).

In FIG. 1A, the first rotor coil 102, excitation coil(s) 105, and receiver coil(s) 106 are shown for purposes of illustration as including one loop. Multiple loops may be used for a given coil. Further, multiple rotor, excitation and/or receiver coils may be used in an implementation of the present disclosure.

As shown in FIG. 1A, the stator 103 defines a cylinder that has a diameter greater than the rotor 101. Also, the rotor 101 is disposed inside of the cylinder (if projected) from the stator 103 above the rotor 101.

As shown in FIG. 1B, multiple receiver coils 106 are identified, including a delta X (ΔX) receiver coil 108, a delta Y (ΔY) receiver coil 110, a delta Z (ΔZ) receiver coil 112, a theta X (θX) receiver coil 114, and a theta Y (θY) receiver coil 116. Also, when configured for use with an angular position sensor, a theta Z (θZ) receiver coil 118 may be included in an implementation of the present disclosure. Such a receiver coil may require a configuration for the rotor coil 102 that is different than the closed loop configuration shown.

Figure 2A:
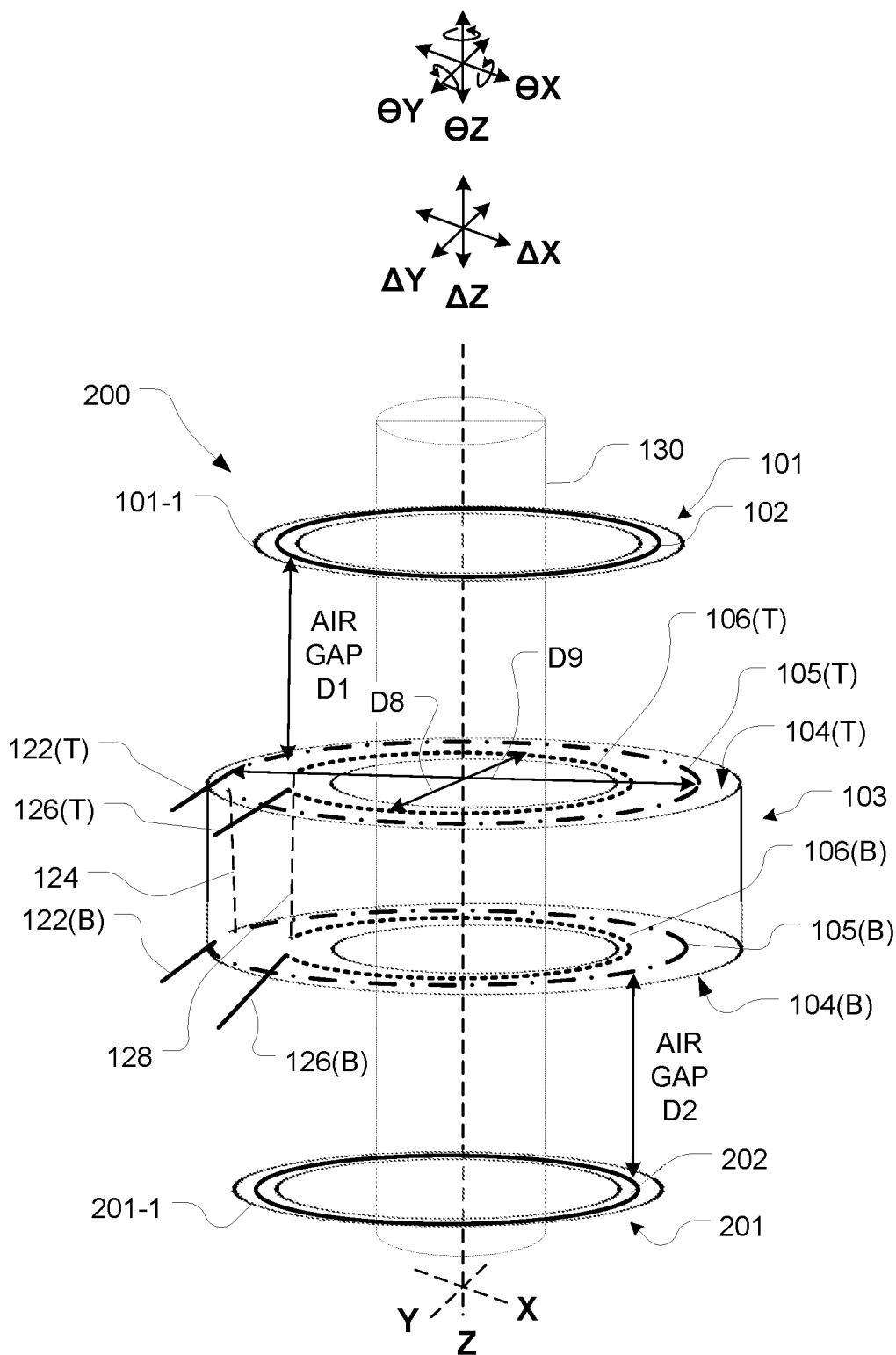
FIG. 2A is a schematic representation of a dual rotor inductive sensor configured in accordance with an implementation.
Figure 2B:
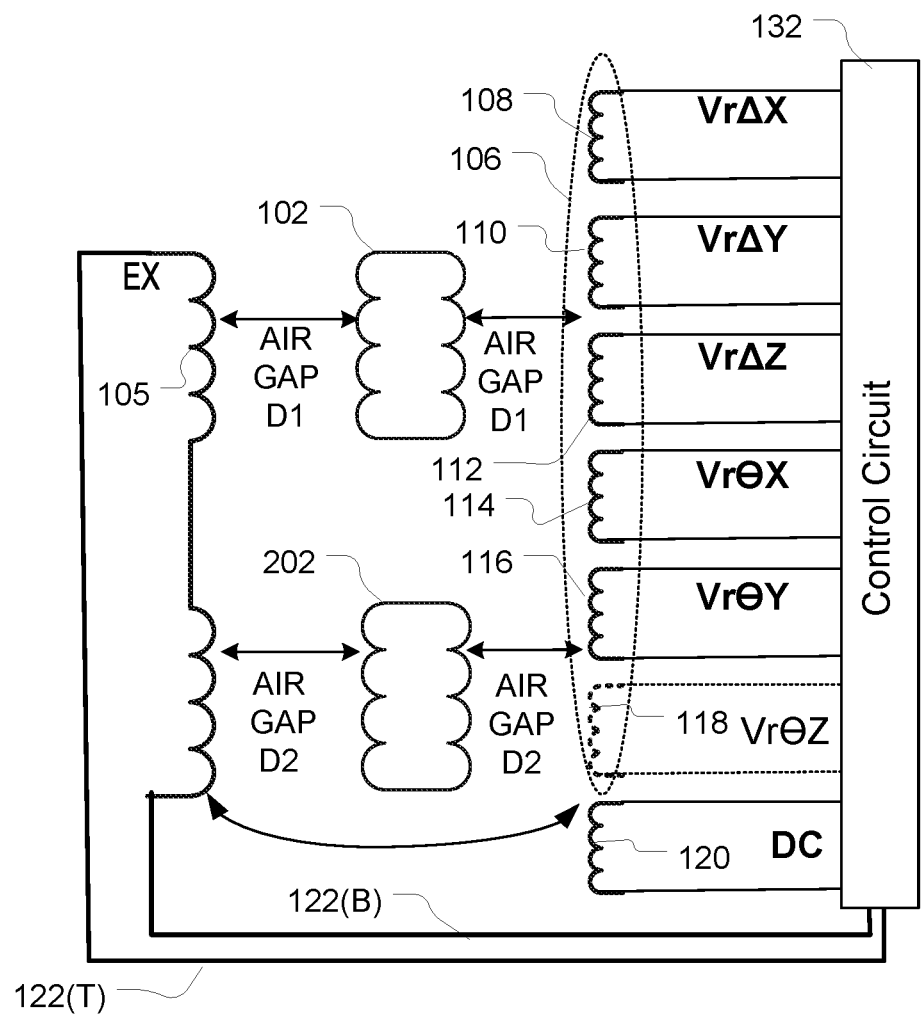
FIG. 2B is an electrical schematic representation of a dual rotor inductive sensor configured in accordance with an implementation.

As shown in FIGS. 2A and 2B, an implementation of the present disclosure may include the first rotor 101 and a second rotor 201. The first rotor 101 and the second rotor 201 (which includes a second rotor substrate 201-1 and a second rotor coil 202) may be corresponding configurations for the first rotor coils 102 and for second rotor coils 202. Any aspect of the rotor 101 (described above) can be applied to the rotor 202. The second rotor 201 may be separated by a second air gap D2 from the stator bottom layer 104(B). The dimensions of the second air gap D2 can be the same as that described in connection with the air gap D1. As shown in at least FIG. 2A, the second rotor 201 (and second rotor substrate 201-1) are aligned along a plane orthogonal to the central axis of rotation (or longitudinal axis) of the shaft 130. For at least one implementation, when the shaft 130 is not misaligned, D1=D2 (plus or minus a given variance, such variance may arise due to mechanical, design or other configurations). By providing the second rotor 201, signal strengths of the receiver coil voltages are increased over a single rotor configuration. Such increase may further facilitate detections of smaller misalignments that otherwise may not be detectable using a single rotor configuration, as shown in FIG. 1A.

During use, the shaft 130 may experience one or more of a slip, tilt, and/or eccentricity misalignment. The one or more receiver coils 106 may be configured to detect one or more of such misalignments due to changes in respective receiver coil voltages Vr, such as a VrΔX, VrΔY, VrΔZ, VrθX, and VrθY. Also, a constant direct coupling (DC) voltage 120 will be induced between the receiver coil(s) 106 with the excitation coil(s) 105 and can be measured by use of a direct coupling coil 120. A given implementation of the present disclosure may be configured to include receiver coils 106 which facilitate detection of changes in one or more alignments, but not all. For example, to detect tilt and eccentricity misalignments one or more delta X, delta Y, delta Z, theta X, and theta Y coils may be used. To detect slip misalignments, the delta Z receiver coil 112 may be used.

Further, during use, when a misalignment occurs, distances in the air gap D1 (and D2=when present) may vary between one or more elements of a given receiver coil 106. Such variances may be used to determine how the misalignment is occurring, such as a tilt toward a given direction on the X-Y reference plane, at one or more portions of the shaft 130 rotation, or otherwise.

As shown in FIGS. 2A and 2B, the second rotor 201 may be added to increase sensitivity of the system. In other words, the first rotor 101 (and first rotor coil 102) (if included alone as shown in FIGS. 1A and 1B) can be used to detect misalignments in delta X, delta Y, delta Z, theta X, and theta Y directions. The second rotor 201 (and second rotor coil 202) can be included to increase sensitivity in detection of misalignments. For example, a misalignment in the delta Z direction, resulting in an increase in air gap D1 and detection by first rotor 101, will also result in a decrease in air gap D2 detected by the second rotor 201.

As shown in FIGS. 3A-3C, an inductive sensor 100/200 may be configured to detect slip misalignments of the shaft 130 by use of the delta Z (ΔZ) receiver coils 112(T/B). As used in FIGS. 3A and 3B (and in FIGS. 5A and 5B), the arrow indicates orientation of a given coil during use of the inductive sensor. In FIG. 3C (and in FIG. 5C), a solid box represents orientation into a given coil and an "X" represents orientation out of a given coil.

As shown, the excitation coil top structure 105(T) (which is also referred to as a top excitation coil (TEC)) and the excitation coil bottom structure 105(B) (which is also referred to as a bottom excitation coil (BEC)) have corresponding structures and corresponding orientations. For at least one implementation, the excitation coil 105 is configured as a top loop and a bottom loop. For at least one implementation, multiple top loops and multiple bottom loops may be used for the excitation coil 105 structure.

The delta Z (ΔZ) receiver coil structures 112(T) and 112(B) (which are collectively referred to herein as a slip receiver coil (ZRC)) have corresponding structures with opposing orientations. For at least one implementation, the delta Z (ΔZ) receiver coil 112 is configured as a top loop and a bottom loop. For at least one implementation, multiple top loops and multiple bottom loops may be used for the delta Z (ΔZ) receiver coil 112 structure. The opposite orientations of the delta Z (ΔZ) receiver coil 112 top and bottom structures minimizes mutual inductance occurring between the excitation coil 105 and the delta Z (ΔZ) receiver coils 112 while amplifying the receiver coil voltage VrΔZ.

Inductive couplings between a given rotor, such as the first rotor 101 and the delta Z (ΔZ) receiver coils 112 (T/B) are opposite in sign and different in magnitude due to the substrate (e.g., PCB) thickness. Accordingly, the inductive coupling between a given rotor 101/201 and the delta Z (ΔZ) receiver coils 112 (T/B) are insensitive to tilt misalignments and eccentricity misalignments.

More specifically, the first rotor 101 and second rotor 201 induce a voltage in the delta Z (ΔZ) receiver coils 112 (T/B) when an excitation current is present in the excitation coils 105(T/B). When the shaft 130 slips up or down, relative to the reference plane formed by the stator 103, the voltages induced in the delta Z (ΔZ) receiver coils 112(T/B) will respectively increase or decrease, as the air gap distance D1 changes (for a single rotor implementation and/or as the air gap distance D2 also changes (for a dual rotor implementation). These voltage changes will be reflected in the corresponding VrΔZ signal provided to the control circuit 132. For example, for a dual rotor implementation, when the shaft 130 slip upwards (in a +Z direction), the inductive coupling between the first rotor 101 and the receiver coil top structure 106(T) decreases, while the inductive coupling between the second rotor 201 and the receiver coil bottom structure 106(B) increases. Given the opposite orientation of the receiver coil bottom structure 106(B), the change in the receiver coil voltage VrΔZ signal is of the same sign (i.e., it also increases or decreases) and thus an amplification of the receiver coil voltage VrΔZ signal is facilitated by use of the optional second rotor 201. In one implementation, a +Z slip of the shaft 130 decreases voltages in the receiver coil voltage VrΔZ while a −Z slip of the shaft 130 increases voltages in the receiver coil voltage VrΔZ. The VrΔZ signal is also referred to herein as a slip receiver coil voltage (Vzr).

When the VrΔZ signal changes, the control circuit 132 may be configured to interpret such change as indicative of a slip misalignment of the shaft 130. With calibration, a change in the VrΔZ signal may be interpreted by the control circuit 132 as representing an occurrence of a slip misalignment and also a magnitude or degree of the slip misalignment. The control circuit 132 may be configured to issue warning signal indicative of a slip misalignment that exceeds a given threshold, or other slip misalignment conditions.

Figure 4:
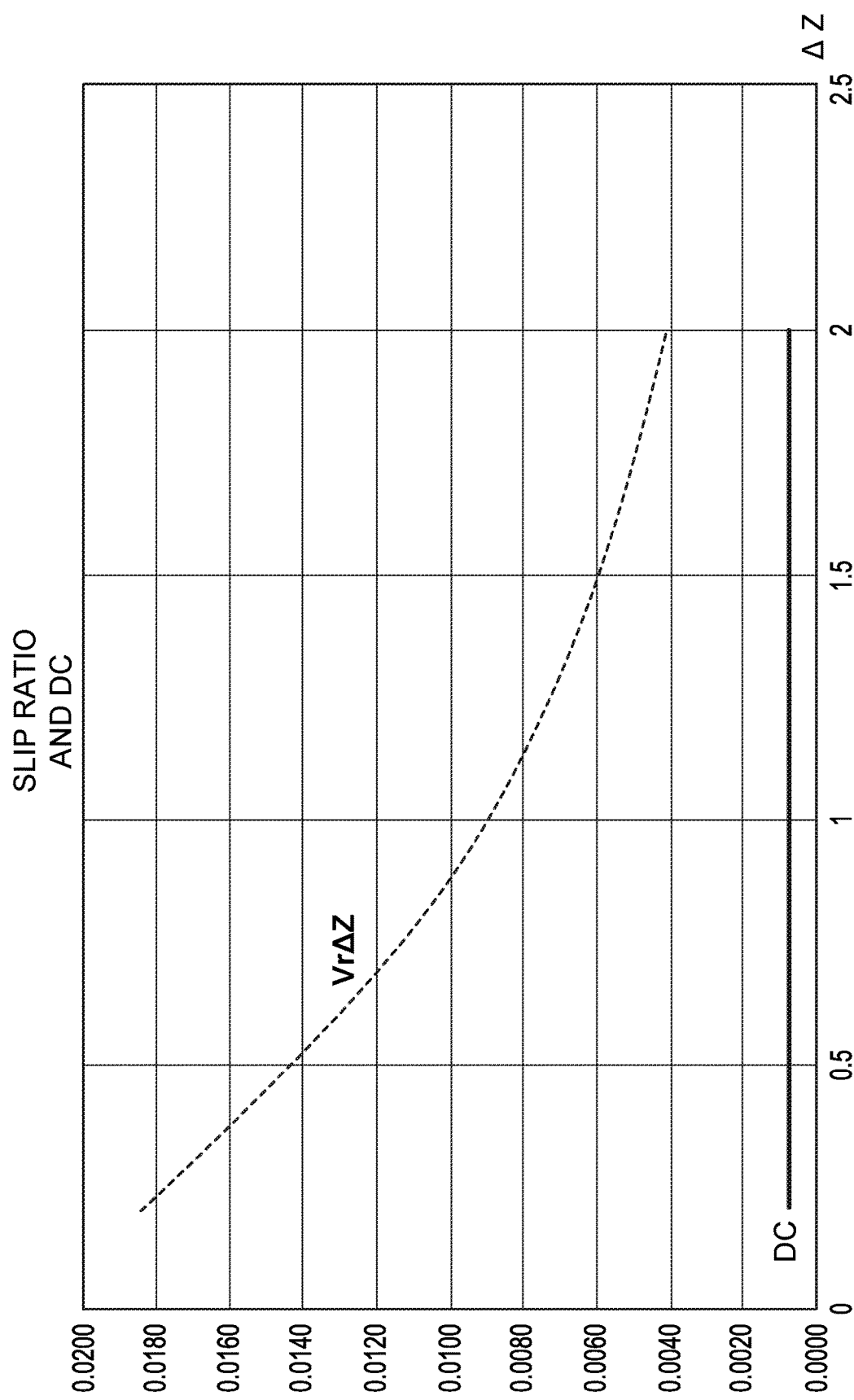
FIG. 4 is a chart illustrating a relationship of a "slip ratio" (as described herein) to a change in position (ΔZ) and also illustrating a direct coupling (DC) signal detectable using a dual rotor inductive sensor of FIG. 3A and in accordance with an implementation.

As shown in FIG. 4, results from a simulation indicate that the direct coupling signal (DC) is independent of a shaft position and provides a reference signal by which a slip misalignment may be determined. In FIG. 4, the horizontal axis represents changes in the air gap D1. The vertical axis represents simulated values of a ratio of the excitation voltage EX to the VrΔZ signal (herein, a "slip ratio") and also the DC signal. The DC signal can be a constant. As shown, when the shaft 130 slips (in a given relative direction), the slip ratio decreases and the air gap increases. By comparing the slip ratio to the DC signal, changes in the air gap D1 can be detected, such changes being indicative of a vibration, a slip misalignment, of the shaft 130 in the +/−Z direction. For at least one implementation, when a slip misalignment is not occurring, the slip ratio is substantially a constant, relative to the DC signal, such that the corresponding ratio does not substantially change over time.

As shown in FIGS. 5A-5C, an inductive sensor 100/200 may be configured to detect tilt misalignments of the shaft 130 by use of a tilt receiver coil (TRC) such as one of the theta X (θX) receiver coils 114 (not shown) and/or the theta Y (θY) receiver coil 116 (shown). The excitation coil top structure 105(T) and the excitation coil bottom structure 105(B) have corresponding structures and corresponding orientations, as described above with respect to FIGS. 3A and 3B.

For at least one implementation, the theta Y (θY) receiver coil may have two similarly configured but opposing structures, a first half loop and a second half loop. Both the first half loop and the second half loop form one-hundred and eighty degrees (180°) arcs across a given stator layer. The first half loop includes a first arc portion 116(1) proceeding along a first portion of the stator top layer 104(T). The first arc portion 116(1) is connected, using a first via 128(1), to a second arc portion 116(2). The second arc portion 116(2) proceeds along a first portion of the stator bottom layer 104(B) and proceeds in an opposite configuration to the first arc portion 116(1). The second half loop is connected to the second arc portion 116(2), using a second via 128(2). The second half loop includes a third arc portion 116(3) and a fourth arc portion 116(4). The third arc portion 116(3) proceeds along a second portion of the stator top layer 104(T). The third arc portion 116(3) is connected, using a third via 128(3), to a fourth arc portion 116(4). The fourth arc portion 116(4) proceeds along a second portion of the stator bottom layer 104(B) and in an opposite configuration to the third arc portion 116(3). The first half loop and the second half loop are coupled in series and are further respectively coupled to the control circuit 132. By using opposing configurations for the top and bottom portions of each of the first half loop and the second half loop, direct coupling between the theta Y (θY) receiver coils 116 and the excitation coils 105 may be minimized.

For a theta X (θX) receiver coil 114 structure (not shown), the theta Y (θY) receiver coil 116 structures shown in FIGS. 4A-4B may be used and rotated on the stator 103 by ninety degrees (90°).

Inductive couplings between a given rotor, such as the first rotor 101 and the theta Y (θY) receiver coils 116 are opposite in sign due to the differences in the first loop and second loop current directions. Accordingly, the inductive coupling between a given rotor 101/201 and the theta Y (θY) receiver coils 116 are sensitive to tilt misalignments.

More specifically, the first rotor 101 and second rotor 201 induce a tilt receiver coil voltage (Vtr) in a TRC, such as a voltage signal VrθY in the theta Y (θY) receiver coils 116, when an excitation current is present in the excitation coils 105(T/B). As shown in FIG. 5C, when the shaft 130 tilts down to the right, relative to the reference plane formed by the stator 103, the voltages induced in the theta Y (θY) receiver coils first loop (formed by the first arc portion 116(1) and the second arc portion 116(2)) will increase, due to the distance D3 decreasing, while the voltages induced in the second loop (formed by the third arc portion 116(3) and the fourth arc portion 116(4)) will decrease, due to the distance D4 increasing.

These voltage changes will be reflected in the corresponding VrθY signal provided to the control circuit 132. For a dual rotor implementation, the second rotor 201 increases voltages induced in the receiver coil voltage VrθY signal.

When the VrθY signal changes, the control circuit 132 may be configured to interpret such change as indicative of a tilt misalignment of the shaft 130. With calibration, changes in one the VrθY signal may be interpreted by the control circuit 132 as representing an occurrence of a tilt misalignment relative to a given axis. When combined with a theta X (θX) receiver coil (not shown) tilt misalignments may be detected relative to the X-Y reference plane as a combination of an X-axis component and a Y-axis component. The control circuit 132 may be configured to issue warning signal indicative of a tilt misalignment that exceeds a given threshold, or other slip misalignment conditions.

Figure 6:
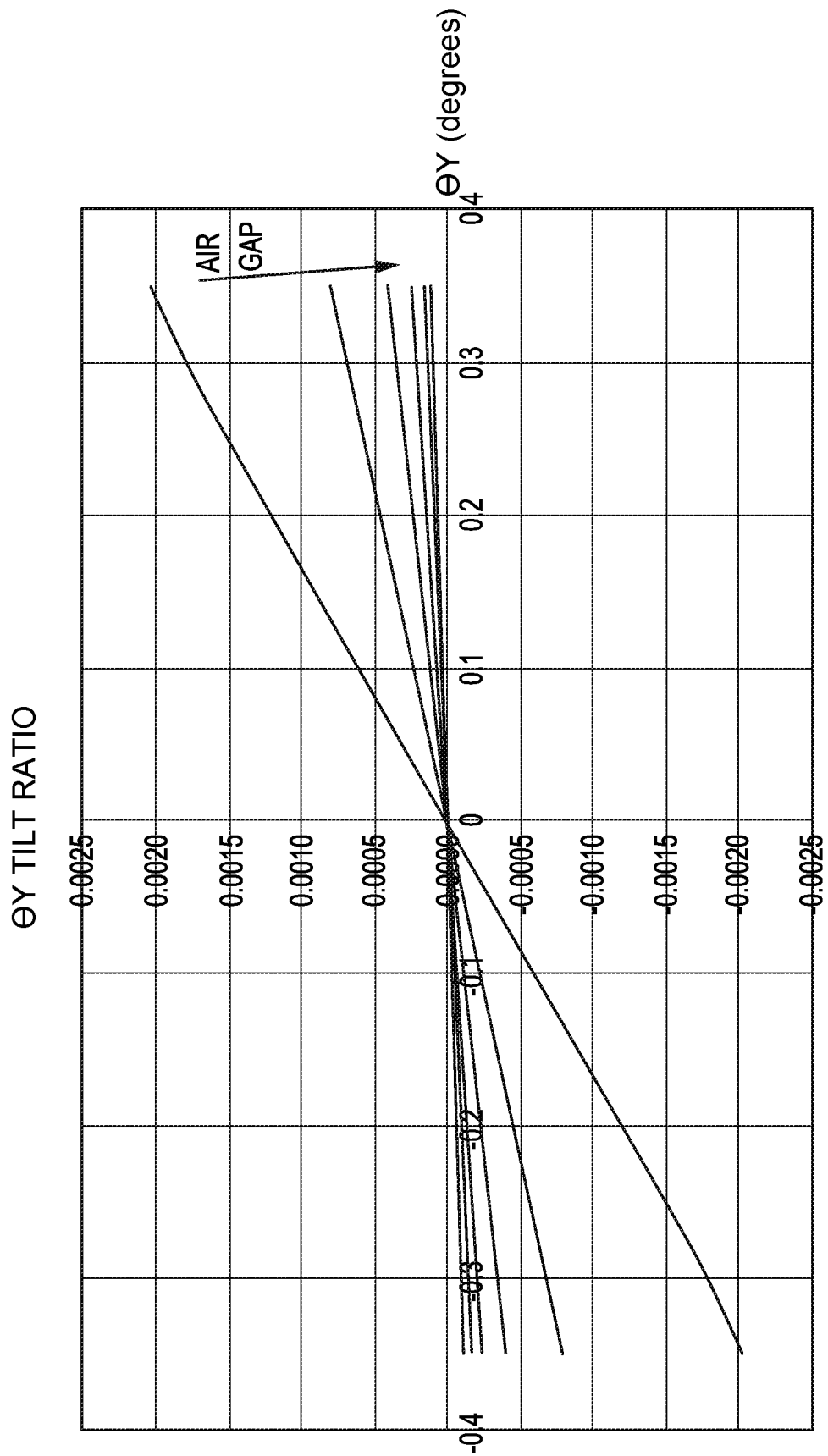
FIG. 6 is a chart illustrating a relationship of a "ΘY tilt ratio" to a given axis, such as a Y-axis tilt (ΘY), detectable using a dual rotor inductive sensor of FIGS. 5A and 5B, and in accordance with an implementation.

As shown in FIG. 6, the horizontal axis represents changes in the tilt of the shaft 130 as a function of changes in the air gap. The vertical axis represents simulated values of a ratio of the excitation voltage EX to the VrθY signal (herein, a "θY tilt ratio"). As discussed above, when a VrθX signal is provided, a ratio of the excitation voltage EX to the VrθX signal (herein, a "θX tilt ratio") may be used by the control circuit 132 to detect when the shaft 130 tilts in the X direction. Further, a combination of the θX tilt ratio and the θY tilt ratio (herein, a "combined tilt ratio") may be used by the control circuit 132 to detect when the shaft 130 tilts in two directions. As shown in FIG. 6, when the shaft 130 tilts (in a given relative direction), the corresponding tilt ratio increases and the air gap decreases. For a single rotor implementation, as shown in FIGS. 1A-1B, the sensitivity of the inductive sensor 100 to a tilt misalignment is a function of the air gap D1. When combined with the VrΔZ signal, such sensitivity may be minimized. Further, when a dual rotor implementation is used, as shown in FIGS. 2A-2B, the sensitivity of the inductive sensor 200 to a tilt misalignments is reduced because a vertical (slip) misalignment of the shaft 130 will result in a corresponding increase (or decrease) in the inductive coupling between a given rotor with the theta X (θX) receiver coil and/or the theta Y (θY) receiver coil.

For at least one implementation, a normal state for a given tilt ratio is a zero ("0") value, which is indicative of no tilt misalignment occurring.

Figures 7A, 7B:
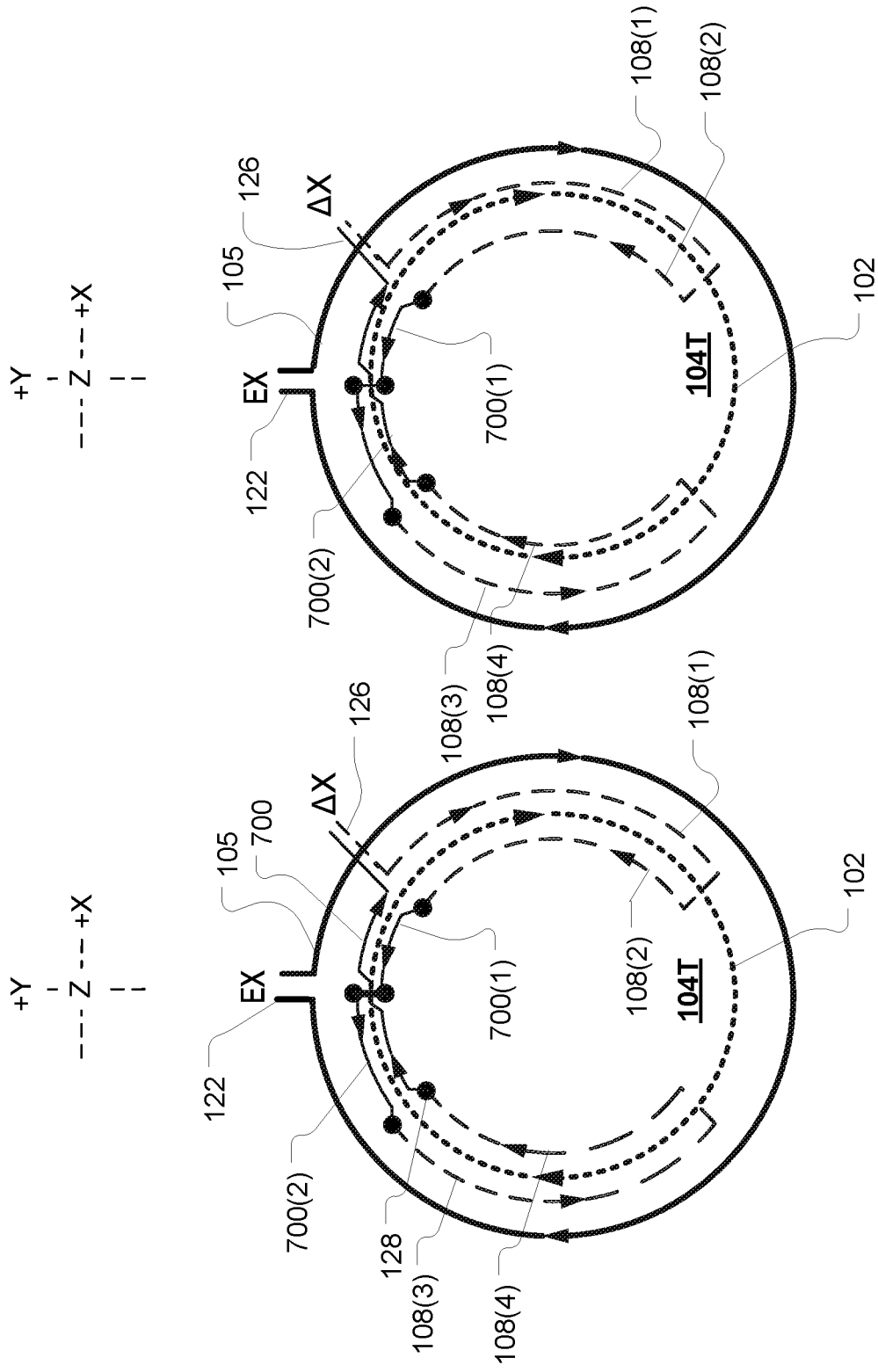
FIG. 7A is a schematic representation of an implementation of inductive sensor configured to detect an eccentricity misalignment of a shaft relative to a representative axis, such as an X-axis, and in accordance with an implementation.
FIG. 7B is a schematic representation of an implementation of the inductive sensor of FIG. 7A, where an eccentricity misalignment has occurred.

As shown in FIGS. 7A-7B, an inductive sensor 100/200 may be configured to detect eccentricity misalignments of the shaft 130 by use of one of the delta X (ΔX) receiver coil 108 (shown) and/or the delta Y (ΔY) receiver coils 110 (not shown) (which are herein also referred to as eccentricity receiver coils (ERCs)). The excitation coil top structure 105(T) and the excitation coil bottom structure 105(B) may have corresponding structures and corresponding orientations, as described above with respect to FIGS. 3A and 3B. Further, for purposes of discussion and with reference to the illustrations of FIGS. 7A and 7B and the ΔX receiver coil 108 implementation, the stator top layer 104(T) may be divided, for purposes of discussion, into two equal portions. Namely, a "first portion" may refer to a right portion of the stator top layer 104(T) and a "second portion" to a left portion of the stator top layer 104(T). For a ΔY receiver coil 110 (not shown), the "first portion" may refer to a top portion of the stator top layer 104(T) and the "second portion" to a bottom portion of the stator top layer 104(T).

The delta X (ΔX) receiver coil 108 (and, when used, the delta Y (ΔY) receiver coil 110 (not shown)) have two similarly configured but opposing structures, a first quarter loop and a second quarter loop. Both the first quarter loop and the second quarter loop form arcs across the stator top layer 104(T) shown in FIGS. 7A and 7B. For an implementation, the arcs may extend for ninety-degrees (90°), forty-degrees (40°), one hundred and twenty degrees (120°), or otherwise. The first quarter loop includes a first arc portion 108(1) coupled to the control circuit 132 by a first receive coil lead 126. The first arc portion 108(1) proceeds along the first portion of the stator top layer 104(T) in a first direction, for example, a clockwise direction (as shown). The first arc portion 108(1) is connected, to a second arc portion 108(2) that also proceeds along the first portion of the stator top layer 104(T) in symmetry with the first arc portion 108(1) but in an opposite direction, for example, in a counter-clockwise direction (as shown). The second art portion 108(2) is connected by vias 128 and connectors 700, the connectors 700 proceeding on the stator bottom layer 104 (B), to the second quarter loop. The second quarter loop includes a third arc portion 108(3) proceeding along the second portion of the stator top layer 104(T) and a fourth arc portion 108(4) that proceeds in symmetry with but in an opposite direction to the third arc portion 108(3). The fourth arc portion 108(4) is connected by via 128 and connectors 700, proceeding on the stator bottom layer 104(B), to receive coil lead 126(B) which further couples the delta X (ΔX) receiver coil 108 to the control circuit 132. Using such a configuration, direct coupling between the excitation coil 105 and the delta X (ΔX) receiver coil 108 may be minimized.

For a delta Y (ΔY) receiver coil 110 structure (not shown), the delta X (ΔX) receiver coil 108 structures shown in FIG. 7A may be used and rotated on the stator 103 by ninety degrees (90°). For an implementation, a combination a ΔX receiver coil 108 and a ΔY receiver coil 110 may be used, where the ΔX receiver coil 108 includes the above described first receiver coil having a first and second quarter loop, while the ΔY receiver coil 110 includes a second receiver coil having a third and fourth quarter loop that are configured similar to the first and second quart loops but rotated by ninety-degrees (90°) on the stator top layer 104(T).

Inductive couplings between a given rotor coil, such as the first rotor coil 102 and the delta X (ΔX) receiver coils 108 (and/or ΔY receiver coils 110, when present) are opposite in sign due to the differences in the first arc portion 108(1) versus the second arc portion 108(2) and the third arc portion 108(3) versus the fourth arc portion 108(4). Accordingly, the inductive coupling between a given rotor 101/201 and the ΔX receiver coils 108 are sensitive to eccentricity misalignments.

More specifically, the first rotor coil 102 induces a voltage in the ΔX receiver coil 108 when an excitation current is present in the excitation coils 105). As shown in FIG. 7B, when the first rotor coil 102 position moves to the right (e.g., in the +X direction as occurring due to the shaft 130 (not shown) so moving), relative to the reference plane formed by the stator 103, the voltages induced in the ΔX receiver coil 108 first arc portion 108(1) and the fourth arc portion 108(4)) will increase, due to the first rotor coil 102 being closer thereto, while the voltages induced in the second and third arc portions 108(2) and 108(3) will decrease (in the opposite magnitude), due to the distance to the first rotor coil 102 increasing. These voltages, when added together, result in an increase in the VrΔX signal when the shaft 130 (as represented by the rotor coil 102) moves to the right.

Similarly, when the first rotor coil 102/shaft 130 moves to the left (e.g., in the −X direction), the distances between the first and fourth arc portions 108(1)/(4) and the first rotor coil 102 will increase, resulting in a decrease in voltages induced therein, while the distances between the second and third arc portions 108(2)/(3) will decrease, resulting in an increase (in the opposite direction) in voltages induced therein. These voltages, when added together, result in a decrease in the VrΔX signal when the shaft 130 moves to the left.

These voltage changes will be reflected in the corresponding VrΔX signal provided to the control circuit 132. For a dual rotor implementation, the second rotor 201 increases voltages induced in the receiver coil voltage VrΔX signal.

Figure 8:
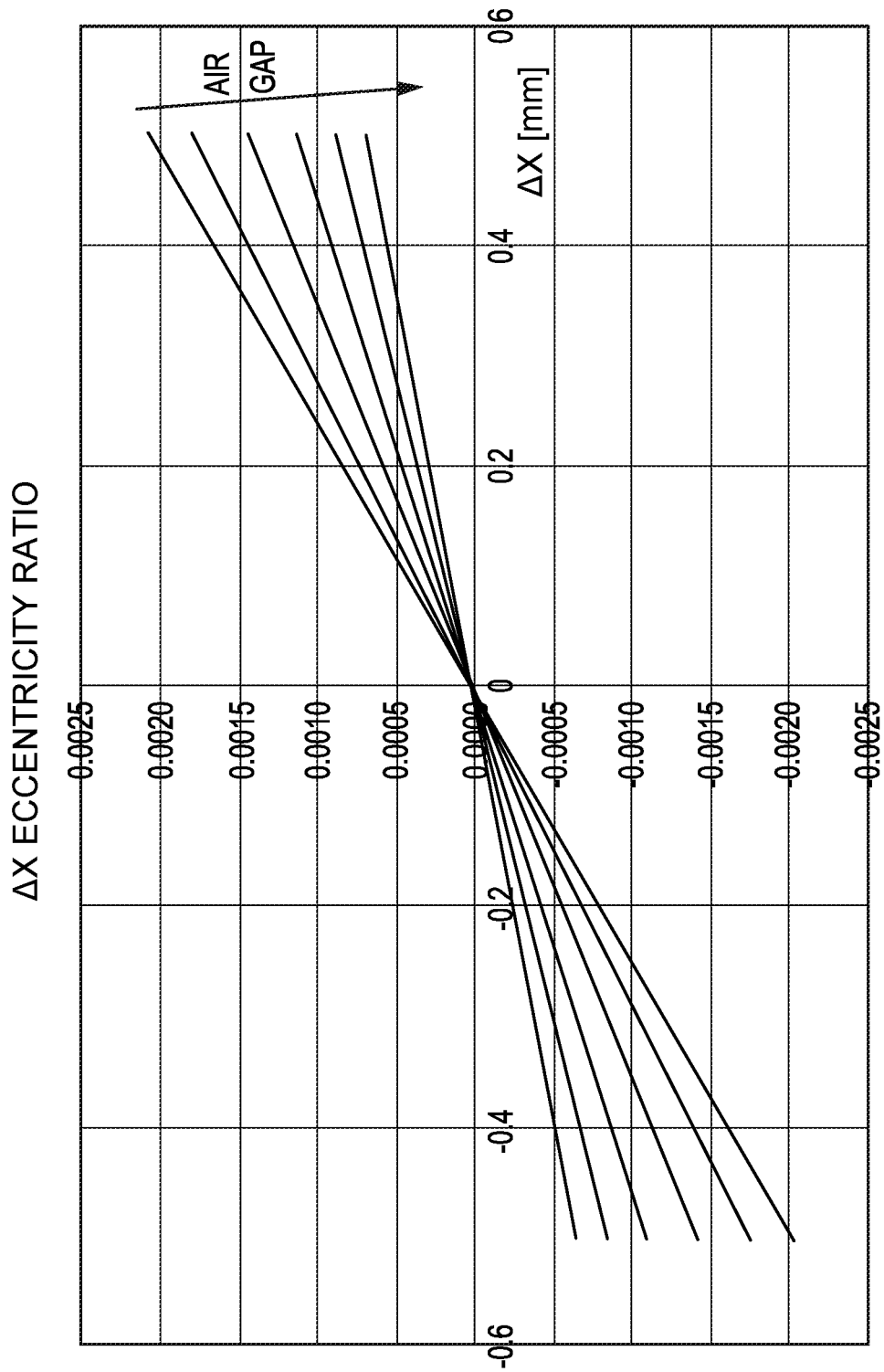
FIG. 8 is a chart illustrating a relationship of a "ΔX eccentricity ratio" (as described below) to a given axis, such as an X-axis (ΔX), detectable using a dual rotor inductive sensor of FIGS. 7A and 7B, and in accordance with an implementation.

As shown in FIG. 8, given the quarter loop configuration of the delta X (ΔX) receiver coils 108, a shift (change in eccentricity) of the shaft 130 and, by extension, the first rotor 101, to the right (along the X-axis) results in a corresponding increase in the VrΔX receiver signal (which is also referred to herein as an eccentricity receiver coil voltage (Ver(n)), where "n" is a given axis), as provided to the control circuit 132. Similarly, a shift (change in eccentricity) of the shaft 130 and the first rotor 101 to the left (along the X-axis) results in a corresponding decrease in the VrΔX receiver signal, as provided to the control circuit 132. When the shaft 130 and first rotor 101 are properly centered (herein, "centrically aligned"), the VrΔX receiver signal ideally has a null value. For a single rotor implementation, as shown in FIGS. 1A-1B, the sensitivity of the inductive sensor 100 to an eccentricity misalignment is a function of the air gap D1. When combined with the VrΔZ signal, such sensitivity may be minimized.

When a dual rotor implementation is used, as shown in FIGS. 2A-2B, the above described structure of the delta X (ΔX) receiver coil 108, the ΔY receiver coil 110 and/or the combination thereof, may be duplicated on the stator bottom layer 104(B). Further, with the dual rotor implementation, the sensitivity of the inductive sensor 200 to eccentricity misalignments is minimized because a vertical (slip) misalignment of the shaft 130 will result in a corresponding increase (or decrease) in the inductive coupling between a given rotor with the duplicated delta X (ΔX) receiver coils (and any duplicated delta Y (ΔY) receiver coils, if any).

In accordance with at least one implementation of the present disclosure, an inductive sensor may include a first rotor. The first rotor may include: a first rotor coil that is mechanically (e.g., physically) coupled to a shaft having a central axis of rotation. The inductive sensor may further include a stator having a stator top layer (STL). The STL may include an STL first portion and an STL second portion. A top excitation coil (TEC) may be formed on the STL first portion and on the STL second portion. A first eccentricity receiver coil (1ERC) be formed on the stator and may include an 1ERC first quarter loop. The 1ERC first quarter loop may form a first arc across the STL first portion and may include an 1ERC first arc portion and an 1ERC second arc portion. The 1ERC first arc portion may extend in a first direction and may be connected in series with the 1ERC second arc portion. The 1ERC second arc portion may extend in an opposite direction. An 1ERC second quarter loop may form the first arc across the STL second portion. The 1ERC second quarter loop may include an 1ERC third arc portion and an 1ERC fourth arc portion. The 1ERC third arc portion may extend in the opposite direction and may be connected in series with the 1ERC fourth arc portion. The 1ERC fourth arc portion may extend in the first direction. A control unit may be coupled to a power source, the 1ERC and the TEC. The TEC may generate a first electromagnetic field while receiving an alternating signal from the power source. A first inductive coupling of the first rotor coil with the TEC may occur due to the first electromagnetic field. Due to the first inductive coupling, the first rotor coil may generate a second electromagnetic field. A second inductive coupling of the 1ERC with the first rotor coil may occur due to the second electromagnetic field. Due to the second inductive coupling, the 1ERC may generate a first eccentricity receiver coil voltage Ver(1). When the shaft is centrically aligned, Ver(1) is a null value. When the shaft is eccentrically aligned, Ver(1) is not a null value. The control unit may be configured to receive Ver(1) from the 1ERC and determine, based on Ver(1), whether the shaft is eccentrically aligned.

Implementations may include one or more of the following features. The central axis of rotation for the shaft may be shifted towards the STL first portion. Ver(1) may be associated with a first value having either a mathematical positive sign or a mathematical negative sign. The central axis of rotation for the shaft may be shifted towards the STL second portion. Ver(1) may be associated with a second value having an opposite mathematical sign to the first value. One of the following sets of configurations may apply: set 1: the STL first portion may be a right portion of the STL and the STL second portion is a left portion of the STL or, for set 2: the STL first portion is a top portion of the STL and the STL second portion is a bottom portion of the STL.

For an implementation, one or more of the following conditions may apply: the first arc may be a ninety-degree (90) arc; the first direction may be clockwise while the second direction is counter-clockwise; the STL first portion may be a right portion of the STL; and/or the STL second portion may be a left portion of the STL.

For an implementation, the inductive sensor may include a second eccentricity receiver coil (2ERC) that may include an 2ERC third quarter loop that forms a second arc across an STL top portion. The 2ERC third quarter loop may include an 2ERC first arc portion and an 2ERC second arc portion. The 2ERC first arc portion may extend in the first direction and may be connected in series with the 2ERC second arc portion. The 2ERC second arc portion may extend in the opposite direction. The 2ERC may include a 2ERC fourth quarter loop that forms a second arc across an STL bottom portion. The 2ERC fourth quarter loop may include an 2ERC third arc portion and an 2ERC fourth arc portion. The 2ERC third arc portion may extend in the opposite direction, may be connected in series with the 2ERC fourth arc portion, and the 2ERC fourth arc portion may extend in the first direction. The control unit may be coupled to the 2ERC. A third inductive coupling of the 2ERC with the first rotor coil may occur due to the second electromagnetic field. Due to the third inductive coupling, the 2ERC may generate a second eccentricity receiver coil voltage Ver(2). When the shaft is centrically aligned, Ver(2) may be a null value and when the shaft is eccentrically aligned towards the STL top portion, Ver(2) is not a null value. The control unit may be configured to receive Ver(2) from the 2ERC and determine, based on Ver(1) and Ver(2), whether the shaft is eccentrically aligned.

For an implementation, the inductive sensor may include a second rotor that may include: a second rotor coil. The second rotor may be mechanically coupled to the shaft. The stator may include a stator bottom layer (SBL), that may include an SBL first portion and an SBL second portion. The stator may include a bottom excitation coil (BEC) formed on the SBL first portion and the SBL second portion. A bottom layer eccentricity receiver coil (BERC) may include a BERC first quarter loop that forms a third arc across the SBL first portion. The BERC first quarter loop may include a BERC first arc portion and a BERC second arc portion. The BERC first arc portion may extend in the opposite direction and be connected in series with the BERC second arc portion. The BERC second arc portion may extends in the first direction. The stator may include a BERC second quarter loop that forms a fourth arc across the SBL second portion. The BERC second quarter loop may include a BERC third arc portion and a BERC fourth arc portion. The BERC third arc portion may extend in the first direction. The BERC third arc portion may be connected in series with the BERC fourth arc portion. The BERC fourth arc portion may extend in the opposite direction. The control unit may be further coupled to the BERC and the BEC. The BEC may generate a third electromagnetic field while receiving an alternating signal from the power source. A third inductive coupling of the second rotor coil with the BEC may occur due to the third electromagnetic field. Due to the third inductive coupling, the first rotor coil may generate a fourth electromagnetic field and a fourth inductive coupling of the BERC with the second rotor coil may occurs due to the fourth electromagnetic field. Due to the fourth inductive coupling, the BERC may generate a first bottom eccentricity receiver coil voltage Verb(1). When the shaft is centrically aligned, Verb(1) is a null value and when the shaft is eccentrically aligned, Verb(1) is not a null value. The control unit may be configured to: receive Verb(1) from the BERC and determine, based on Ver(1) and Verb(1), whether the shaft is eccentrically aligned.

For an implementation, the stator may include a stator bottom layer (SBL) that may include an SBL first portion that may be positioned below the STL first portion, and an SBL second portion that may be positioned below the STL second portion. The stator may include a first tilt receiver coil (1TRC) that may include: a 1TRC first half loop, that may further include a 1TRC first arc portion extending across the STL first portion. The 1TRC first arc portion may extend in a third direction. A 1TRC second arc portion may extend across the SBL first portion. The 1TRC second arc portion may extend in a fourth direction that is opposite to the third direction. A first via may couple the 1TRC first arc portion with the 1TRC second arc portion. A second via may be included and a 1TRC second half loop, coupled by the second via to the 1TRC first half loop, may include a 1TRC third arc portion extending across the STL second portion. The 1TRC third arc portion may extend in the fourth direction. A 1TRC fourth arc portion may extend across the SBL second portion and in the third direction. A third via may couple the 1TRC third arc portion with the 1TRC fourth arc portion. The control unit may be further coupled to the 1TRC. A third inductive coupling of the 1TRC with the first rotor coil may occur due to the second electromagnetic field. Due to the third inductive coupling, the 1TRC may generate a first tilt receiver coil voltage Vtr(1). When the shaft is not tilting, Vtr(1) is a null value and, when the shaft is tilting, Vtr(1) is not a null value. The control unit may be configured to receive Vtr(1) from the 1TRC and determine, based on Vtr(1), whether the shaft is tilting.

For an implementation, the 1TRC may determines tilting of the shaft relative to an X axis of a coordinate space defined by the X axis, a Y axis and a Z axis and the central axis of the shaft may correspond to the Z axis. The 1TRC may determine tilting of the shaft relative to a Y axis of a coordinate space defined by an X axis, the Y axis and a Z axis. The first direction and the third direction may be substantially identical and the second direction and fourth direction may be substantially identical. The first direction may be clockwise.

For an implementation, the inductive sensor may include: an STL third portion, perpendicular (e.g., orthogonal) to the STL first portion and an STL fourth portion, perpendicular to the STL second portion. The SBL third portion, may be perpendicular to the SBL first portion and the SBL fourth portion may be perpendicular to the SBL second portion. A second tilt receiver coil (2TRC) may be included and may further include a 2TRC first half loop, that may include a 2TRC first arc portion extending across the STL third portion. The 2TRC first arc portion extends in the third direction and is perpendicular to the 1TRC first arc portion; a 2TRC second arc portion extending across the SBL third portion; where the 2TRC second arc portion may extend in the fourth direction and may be perpendicular to the 1TRC second arc portion. A fourth via may couple the 2TRC first arc portion with the 2TRC second arc portion. The inductive sensor may include a fifth via and a 2TRC second half loop, coupled by the fifth via to the 2TRC first half loop, that may include: a 2TRC third arc portion extending across the STL fourth portion. The 2TRC third arc portion may extend in the fourth direction. A 2TRC fourth arc portion may extend across the SBL second portion and a sixth via may couple the 2TRC third arc portion with the 2TRC fourth arc portion. The control unit may be further coupled to the 2TRC. A fourth inductive coupling of the 2TRC with the first rotor coil may occur due to the second electromagnetic field. Due to the fourth inductive coupling, the 2TRC may generate a second tilt receiver coil voltage Vtr(2). When the shaft is not tilting, Vtr(2) is a null value and when the shaft is tilting, Vtr(2) is not a null value. The control unit may be configured to receive Vtr(2) from the 2TRC and determine, based on Vtr(2), whether the shaft is tilting.

For an implementation, the 1TRC may determine tilting of the shaft relative to an X axis of a coordinate space defined by the X axis, a Y axis and a Z axis. The 2TRC may determine tilting of the shaft relative to the Y axis. The central axis of the shaft may correspond to the Z axis.

For an implementation, the inductive sensor may include: a second rotor that may include: a second rotor coil. The second rotor may be mechanically coupled to the shaft and proximate to the SBL. The stator further may include a bottom excitation coil (BEC) formed on the SBL first portion and the SBL second portion. The control unit may be further coupled to the BEC. The BEC may generate a third electromagnetic field while receiving the alternating signal from the power source. A fourth inductive coupling of the second rotor coil with the BEC may occur due to the third electromagnetic field. Due to the fourth inductive coupling, the second rotor coil may generate a fourth electromagnetic field. A fifth inductive coupling of the 1ERC with the second rotor coil may occur due to the fourth electromagnetic field. Due to the fifth inductive coupling, the first eccentricity receiver coil voltage Ver(1) may be amplified. A sixth inductive coupling of the 1TRC with the second rotor coil may occur due to the fourth electromagnetic field. Due to the sixth inductive coupling, the first tilt receiver coil voltage Vtr(1) may be amplified.

For an implementation, the first direction and the fifth direction may be substantially identical and the second direction and sixth direction may be substantially identical. The stator further may include: a stator bottom layer (SBL) that may further include an SBL first portion positioned above the SBL first portion, and an SBL second portion positioned above the STL bottom portion. A slip receiver coil (ZRC) may be included and may include a ZRC top loop, a ZRC bottom loop, and a ZRC via, coupling the ZRC top loop with the ZRC bottom loop. The ZRC top loop may extend in a fifth direction, and the ZRC bottom loop may extend in a sixth direction that is opposite to the fifth direction. The control unit may be further coupled to the ZRC. A seventh inductive coupling of the ZRC with the first rotor coil may occur due to the second electromagnetic field. Due to the seventh inductive coupling, the ZRC may generate a slip receiver coil voltage Vzr. When the shaft is not slipping, a current slip ratio, of Vzr divided by a direct coupling signal value, is equal to a reference value, and when the shaft is slipping, the current slip ratio is not equal to the reference value. The control unit may be configured to receive Vzr from the ZRC and further determine, based on a comparison of the current slip ratio to the reference value, whether the shaft is slipping at a given time.

Although various implementations of the claimed invention have been described above with a certain degree of particularity, or with reference to one or more individual implementations, those skilled in the art could make alterations to the disclosed implementations without departing from the spirit or scope of the claimed invention. The use of the terms "about," "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "before," "after," and other similar terms are used for description and ease of reference purposes only and are not intended to be limiting to any orientation or configuration of any elements or sequences of operations for the various implementations of the present disclosure. Further, the terms "and" and "or" are not intended to be used in a limiting or expansive nature and cover any range of combinations of elements and operations of an implementation of the present disclosure. Other implementations are therefore contemplated. It is intended that all matter contained in the above description and shown in the accompanying drawings shall be interpreted as illustrative only of implementations and not limiting. Changes in detail or structure may be made without departing from the basic elements of the invention as defined in the following claims.

What is claimed is:

1. An inductive sensor comprising:
a shaft having an axis of rotation;
a rotor physically coupled to the shaft and including a rotor coil, the rotor and the rotor coil being aligned along a plane orthogonal to the axis of rotation; and
a stator including:
a stator layer,
an excitation coil, and
at least one receiver coil, the excitation coil and the at least one receiver coil being physically coupled to a top surface of the stator layer.

2. The inductive sensor of claim 1, wherein the rotor includes a rotor substrate aligned along the plane orthogonal to the axis of rotation.

3. The inductive sensor of claim 2, wherein the rotor coil is physically coupled to at least a portion of a surface of the rotor substrate.

4. The inductive sensor of claim 2, wherein the plane is a first plane, the stator is aligned along a second plane parallel to the first plane, at least a portion of the rotor coil is disposed between the rotor substrate and the stator.

5. The inductive sensor of claim 1, wherein the rotor coil is disposed above the stator such that an axis parallel to the axis of rotation intersects both the rotor coil and the stator.

6. The inductive sensor of claim 1, wherein the rotor includes a rotor substrate, the rotor coil has at least a portion physically coupled to at least a portion of a surface of the rotor substrate.

7. The inductive sensor of claim 1, wherein the stator layer is a stator top layer (STL),
the stator further including a bottom stator layer (SBL).

8. The inductive sensor of claim 1, wherein the excitation coil is a top excitation coil (TEC),
the stator further including a bottom excitation coil (BEC).

9. The inductive sensor of claim 1, wherein the rotor coil is configured to rotate within the plane such that rotor coil rotates parallel to the stator.

10. The inductive sensor of claim 1, wherein the rotor coil is separated from the stator by a distance 10 times less than a diameter of at least one of the excitation coil or the at least one receiver coil.

11. The inductive sensor of claim 1, wherein the stator has an outer diameter and is disposed within a cylinder having the outer diameter, the rotor coil rotates within the cylinder.

12. The inductive sensor of claim 1, wherein the at least one receiver coil includes at least one of a receiver coil sensitive to eccentricity, a receiver coil sensitive to tilt, or a receiver coil sensitive to a slip direction.

13. The inductive sensor of claim 1, wherein the rotor is a first rotor, the rotor coil is a first rotor coil,
the inductive sensor, further comprising:
a second rotor physically coupled to the shaft and including a second rotor coil, the second rotor coil increasing sensitivity to misalignments over a single rotor coil.

14. An inductive sensor comprising:
a shaft having an axis of rotation;
a stator being disposed around the shaft and including:
a stator layer,
an excitation coil (EC), and
at least one receiver coil, the excitation coil having a portion and the at least one receiver coil having a portion that are coupled to a planar surface of the stator layer; and
a rotor coupled to the shaft, the rotor including a rotor substrate and a rotor coil coupled to at least a portion of the rotor substrate, the rotor substrate being aligned along a plane orthogonal to the axis of rotation of the shaft, the rotor coil having at least a portion disposed between the plane and the stator.

15. The inductive sensor of claim 14, wherein rotor coil is disposed above the stator such that an axis parallel to the axis of rotation intersects both the rotor coil and the stator.

16. The inductive sensor of claim 14, wherein the stator layer is a stator top layer (STL) or a bottom stator layer (SBL), and the excitation coil is a top excitation coil (TEC) or a bottom excitation coil (BEC).

17. The inductive sensor of claim 14, wherein the rotor coil is configured to rotate within the plane such that rotor coil rotates parallel to the stator.

18. The inductive sensor of claim 14, wherein the rotor coil is separated from the stator by a distance 10 times less than a diameter of at least one of the excitation coil or the at least one receiver coil.

19. The inductive sensor of claim 14, wherein the rotor coil is circular.

20. The inductive sensor of claim 14, wherein the at least one receiver coil includes at least one of a receiver coil sensitive to eccentricity, a receiver coil sensitive to tilt, or a receiver coil sensitive to a slip direction.

21. The inductive sensor of claim 14, wherein the rotor is a first rotor, the rotor coil is a first rotor coil,
the inductive sensor, further comprising:
a second rotor coupled to the shaft such that the stator is disposed along the shaft between the first rotor and the second rotor.

22. An inductive sensor comprising:
a shaft having an axis of rotation;
a rotor coupled to the shaft and including a rotor coil, the rotor and the rotor coil being aligned along a plane orthogonal to the axis of rotation; and
a stator including:
a stator layer,
an excitation coil, and
at least one receiver coil, the excitation coil having a portion and the at least one receiver coil having a portion that are coupled to the stator layer and aligned within a same plane on the stator layer.

23. The inductive sensor of claim 22, wherein the portion of the excitation coil is disposed within the same plane on the stator layer outside of the portion of the at least one receiver coil.

24. The inductive sensor of claim 22, wherein the portion of the excitation coil has a diameter larger than a diameter of the portion of the at least one receiver coil.

* * * * *